July 28, 1970 W. G. PFISTERER ET AL 3,521,844
MILKING PARLOR HOSE SUPPORT
Filed Sept. 26, 1968

INVENTORS
WILBUR G. PFISTERER
& WALLACE L. OLSTAD
BY Joseph G. Werner

ATTORNEY

United States Patent Office 3,521,844
Patented July 28, 1970

3,521,844
MILKING PARLOR HOSE SUPPORT
Wilbur G. Pfisterer, 2211 Liberty Lane, Janesville, Wis. 53545, and Wallace L. Olstad, Rte. 1, Edgerton, Wis. 53534
Filed Sept. 26, 1968, Ser. No. 762,863
Int. Cl. F16l 3/10
U.S. Cl. 248—74
2 Claims

ABSTRACT OF THE DISCLOSURE

A hose support fixture, having quick connection and release clamps for holding milk transfer hoses above the floor in a farm milking parlor. The fixture has a base for mounting in a fixed position, and spaced supporting clamps attached to the base, each clamp having a fixed jaw and an adjustable tension-biased pivotable jaw. The jaws are made of paraffin impregnated Teflon.

BACKGROUND OF THE INVENTION

This invention relates to clamping fixtures for suspending milk transfer hoses above the floor of a milking parlor.

In the past, typically dairymen have followed the unsanitary and rather cumbersome practice of allowing their milk transfer hoses to merely lay on the floor of the barn and milking parlor. This, of course, subjects the hoses to the unsanitary conditions on the floor of the barn and to the danger of being damaged by cows walking on them. In addition, cows would often kick the hoses and thereby cause the milking unit to fall off the udder of the cow.

Several known hose suspension clamping devices have been developed in recent years, but have not met with wide commercial acceptance. Several difficulties with these known devices are that the devices have not provided adjustable tension quick connect and disconnect features and have generally employed metal clamping jaws which tended to damage and wear the flexible hoses after a relatively short period of use.

SUMMARY OF THE INVENTION

Generally, our invention comprises a clamping fixture for suspending milk transfer hoses horizontally or vertically above the floor of a milking parlor including adjustable tension clamping jaws made of low-friction, non-abrasive material to facilitate quick insertion and removal of the hoses while at the same time greatly reducing the wear on the hoses. The fixture will accommodate hoses of various diameters without crimping the base at the point of support.

By suspending the milk transfer hoses above the floor, the cows cannot walk on the hoses nor kick the hoses and cause the milking unit to fall off the udder. Moreover, by by using our invention, a tension can be up on the milk transfer hose instead of having the hose hang loosely beneath the cow. This tension on the milk transfer hose creates a pulling tension on the milking unit attached to the udder of the cow. Thus, besides the sucking action of the milking unit, there is also a pulling tension on the teats of the cow, and this tension increases the rate of flow of milk from the cow thereby reducing the amount of time it takes to milk each cow.

Our objectives are accomplished by providing a rigid base adapted to be fixedly mounted to a horizontal or vertical surface with one or more hose-holding clamps made of paraffin impregnated Teflon mounted on the base. Each clamp has one fixed jaw and one pivotable jaw, the pivotable jaw being resiliently held in the closed-clamp position by an adjustable-tension rubber button.

Other objects, features and advantages of our invention will be apparent from the following detailed description taken in conjunction with the accompanying drawings showing a preferred embodiment exemplifying the principles of our invention.

DESCRIPTION OF A PREFERRED EMBODIMENT

Figures 1, 2:
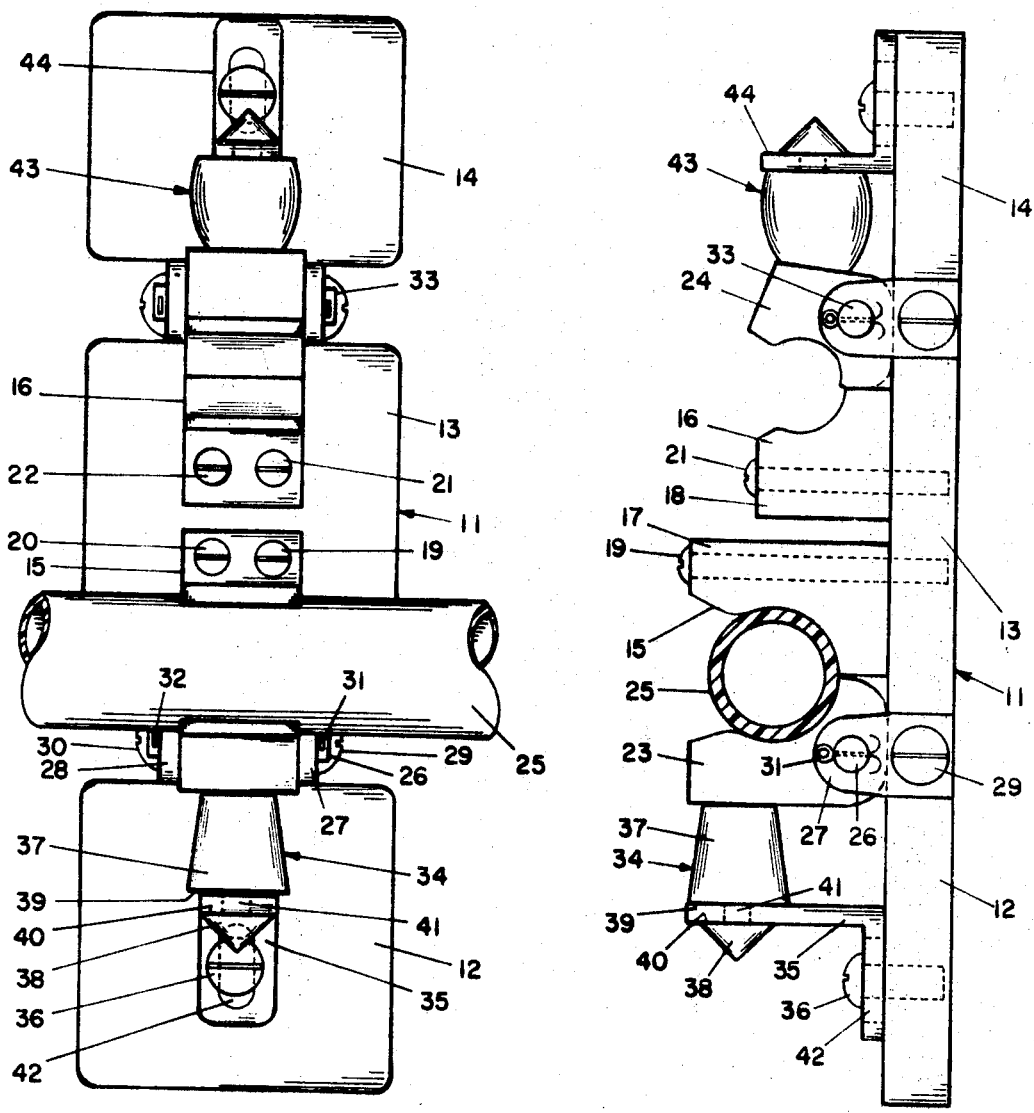
FIG. 1 is a top plan view of a hose support fixture embodying our invention.
FIG. 2 is a front plan view of the fixture shown in FIG. 1.

More specifically, referring to FIGS. 1 and 2, a one piece base 11 having three distinct sections 12, 13 and 14 is shown with hose clamps 15 and 16 mounted thereon. Jaws 17 and 18 of clamps 15 and 16, respectively, are fixedly mounted to the center section 13 of base 11 by screws 19–22. Jaws 23 and 24 of clamps 15 and 16, are pivotably mounted at the necks formed in the base between sections 12 and 13, and sections 13 and 14, respectively. Jaw 23 of clamp 15, shown in its closed position, thereby holding a length of hose 25 is pivotable about pin 26. Pin 26 is supported in spaced relation from the base by brackets 27 and 28 which are fastened to the base by screws 29 and 30. Cotter pins 31 and 32 maintain pin 26 in brackets 27 and 28. Likewise, jaw 24 of clamp 16, shown in its open position, pivots about pin 33 which is supported and held in position by similar brackets, screws and cotter pins.

A rubber compression button 34 resiliently urges jaw 23 toward its closed clamp position. The compression button 34 is supported by bracket 35 which is fastened to section 12 of base 11 by screw 36. Compression button 34 has a large biased end 37, a small cone shaped end 38 and a neck of smaller dimensions than either of surfaces 39 or 40 of ends 37 and 38, respectively. The small end 38 is inserted through hole 41, which is of the same dimensions as the neck of compression button 34, of bracket 35, and compression button 34 is thereby mounted in and supported by bracket 35.

Bracket 35 has an elongate slot 42 formed therein so that the position of bracket and compression button 34 can be adjusted. As shown, bracket 35 and button 34 are adjusted so that pivotable jaw 23 of clamp 15 is resiliently maintained in its closed position, thereby holding hose 25 in place.

Pivotable jaw 24 of clamp 16 has a rubber compression button 43 and associated bracket 44 similar to compression button 34 and bracket 35. For illustration purposes, pivotable jaw 24 is shown in an open position. When the clamp is in its open position, it is seen that button 43 is in a compressed state so that it urges jaw 24 into its closed clamp position.

When the compression buttons and their brackets are properly adjusted, as a milking hose is pushed into the clamp the pivotable jaw thereof is forced open and the compression button is compressed as shown in the drawings. When the hose is in position in the clamp, the compression force of the resilient rubber button forces the pivoting jaw closed into its clamping position.

Likewise when a hose is removed by pulling it out of the clamp, the pivotable jaw is forced open and when the hose is clear of the clamp, the compression button urges the said jaw back to its clamping position.

The jaws of the clamps are made of paraffin impregnated Teflon and the open end of the jaws are beveled so that the milk hoses can be pushed into the clamping jaws and removed therefrom with a minimum of friction, thereby greatly reducing the wear on the hoses. It is understood that any substantially rigid, low friction, non-abrasive material can be used in fabricating the jaws of the clamps, and is not limited to paraffin impregnated Teflon which is the preferred material.

It is also understood that the means of holding the pivotable clamping jaws in closed clamp position is not limited to a rubber compression button, but that any resilient biasing means or spring can perform the same function.

It is further understood that the embodiments herein shown only exemplify the principles of our invention, and that our invention is not confined to the particular construction or arrangements of parts herein illustrated and described, but embraces all such modified forms thereof as come within the scope of the following claims.

I claim:

1. A fixture for supporting milk hoses above the floor of a milking parlor, comprising:
   (a) an elongate rigid base,
   (b) at least a pair of clamps,
      (i) said clamps having a stationary jaw fixedly mounted on said base and an opposed movable jaw pivotably attached to said base for pivotal movement between an open and closed position,
      (ii) said jaws being made of a low friction, non-abrasive material,
   (c) compression biasing means urging said pivotable jaws toward their closed position, and
   (d) longitudinally slidable brackets mounted on said base for maintaining said compression biasing means against said pivotable jaws and for varying the compressive force exerted thereby against said pivotable jaws.

2. The fixture for supporting milk hoses as specified in claim 1 wherein said clamping jaws are comprised of paraffin impregnated Teflon.

References Cited

UNITED STATES PATENTS

| | | | |
|---|---|---|---|
| 1,289,995 | 12/1918 | Wrage | 248—74 X |
| 3,095,092 | 6/1963 | Magarian | 24—254 X |
| 3,286,963 | 11/1966 | Bergman | 248—74 |

CHANCELLOR E. HARRIS, Primary Examiner

U.S. Cl. X.R.

24—254; 248—226, 316